(12) United States Patent
Wang et al.

(10) Patent No.: US 11,663,145 B2
(45) Date of Patent: May 30, 2023

(54) OFF-CHIP MEMORY ADDRESS SCRAMBLING APPARATUS AND METHOD FOR SYSTEM ON CHIP

(71) Applicant: C-SKY Microsystems Co., Ltd., Zhejiang (CN)

(72) Inventors: Jie Wang, Hangzhou (CN); Xianshao Chen, Hangzhou (CN); Peng Jiang, Hangzhou (CN); Yucan Gu, Hangzhou (CN); Aiyong Ma, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 251 days.

(21) Appl. No.: 16/479,571

(22) PCT Filed: Dec. 21, 2018

(86) PCT No.: PCT/CN2018/122776
§ 371 (c)(1),
(2) Date: Jul. 19, 2019

(87) PCT Pub. No.: WO2019/120293
PCT Pub. Date: Jun. 27, 2019

(65) Prior Publication Data
US 2019/0370189 A1 Dec. 5, 2019

(30) Foreign Application Priority Data
Dec. 22, 2017 (CN) .......................... 201711428664.8

(51) Int. Cl.
*G06F 12/14* (2006.01)
*G06F 21/79* (2013.01)
(Continued)

(52) U.S. Cl.
CPC .......... *G06F 12/1408* (2013.01); *G06F 21/79* (2013.01); *G11C 8/20* (2013.01); *H04L 9/0869* (2013.01)

(58) Field of Classification Search
CPC ....... G06F 12/1408; G06F 21/79; G11C 8/20; H04L 9/0869
See application file for complete search history.

(56) References Cited

U.S. PATENT DOCUMENTS 4,613,901 A * 9/1986 Gilhousen ............ H04N 7/1675
380/239
5,943,283 A * 8/1999 Wong ...................... G06F 21/79
365/230.01
(Continued)

FOREIGN PATENT DOCUMENTS

| CN | 102541762 A | 7/2012 | |
| CN | 102541762 | * 12/2012 | ............. G06F 12/14 |

(Continued)

OTHER PUBLICATIONS

Machine Translation of application CN102541762 A1, Beijing Guorui Zhongshu Technology Co. Ltd. (Year: 2012).*
(Continued)

*Primary Examiner* — Shanto Abedin
(74) *Attorney, Agent, or Firm* — Finnegan, Henderson, Farabow, Garrett & Dunner, LLP (57) ABSTRACT

The present disclosure provides an off-chip memory address scrambling apparatus and method for a system on chip. The apparatus includes a true random number generator, a key memory and an on-chip security controller. The on-chip security controller is connected to the true random number generator, the key memory and an off-chip memory respectively and is configured to read or write data in the off-chip memory and perform address scrambling processing on the data. The on-chip security controller includes: a memory (Continued)

interface module, and an address scrambling module configured to read a random key stored in the key memory, to select according to a valid/invalid state of the random key to directly invoke the read random key or read again a random key that is generated by the true random number generator and stored into the key memory, and then to perform according to the random key scrambling algorithm processing on an unscrambled address inputted by the memory interface module to form a scrambled address, and output the scrambled address to an address scrambling module of the off-chip memory. The present disclosure can improve the security while high efficiency.

11 Claims, 5 Drawing Sheets

(51) Int. Cl.
*G11C 8/20* (2006.01)
*H04L 9/08* (2006.01)

(56) References Cited

U.S. PATENT DOCUMENTS

| | | | | |
|---|---|---|---|---|
| 6,792,528 | B1* | 9/2004 | Hou | G06F 12/1408 |
| | | | | 380/57 |
| 7,389,316 | B1* | 6/2008 | Baetoniu | G06F 1/02 |
| | | | | 708/250 |
| 8,375,225 | B1* | 2/2013 | Ybarra | G06F 21/85 |
| | | | | 713/153 |
| 8,555,082 | B1* | 10/2013 | Bibikar | H04L 9/0618 |
| | | | | 713/189 |
| 8,862,901 | B2* | 10/2014 | Rao | G06F 12/1408 |
| | | | | 713/190 |
| 9,235,712 | B1* | 1/2016 | Bibikar | H04L 9/0618 |
| 10,740,466 | B1* | 8/2020 | Bshara | G06F 21/71 |
| 11,048,644 | B1* | 6/2021 | Volpe | G06F 12/1036 |
| 2008/0152142 | A1* | 6/2008 | Buer | G06F 12/1408 |
| | | | | 380/270 |
| 2008/0288785 | A1* | 11/2008 | Rao | G06F 21/72 |
| | | | | 713/190 |
| 2010/0241874 | A1* | 9/2010 | Vergnes | G06F 21/71 |
| | | | | 713/193 |
| 2013/0262880 | A1* | 10/2013 | Pong | G06F 21/79 |
| | | | | 713/193 |
| 2014/0019686 | A1 | 1/2014 | Dong | |
| 2015/0033037 | A1* | 1/2015 | Lidman | G06F 21/78 |
| | | | | 713/193 |
| 2015/0234751 | A1* | 8/2015 | Van Der Sluis | H04L 9/0866 |
| | | | | 713/193 |
| 2016/0028695 | A1 | 1/2016 | Binder | |
| 2016/0078252 | A1 | 3/2016 | Chandra et al. | |
| 2016/0092702 | A1* | 3/2016 | Durham | G06F 9/34 |
| | | | | 713/190 |
| 2017/0147509 | A1* | 5/2017 | Nevers | G06F 21/552 |

FOREIGN PATENT DOCUMENTS

| | | |
|---|---|---|
| CN | 106688027 A | 5/2017 |
| CN | 108182371 A | 6/2018 |
| CN | 108229215 A | 6/2018 |
| WO | WO 2019/120293 A1 | 6/2019 |

OTHER PUBLICATIONS

Extended European search report and supplementary European search report in European Application No. 18893076.2, dated Jan. 11, 2021 (9 pgs.).

International Search Report and Written Opinion issued in related International Application No. PCT/CN2018/122776, dated Mar. 27, 2019 (8 pgs.).

First Chinese Search Report issued in corresponding Chinese Application No. 201711428664.8 dated Apr. 17, 2019 (1 page).

Communication pursuant to Article 94(3) EPC issued by the European Patent Office in corresponding European Application No. 18893076.2, dated Feb. 3, 2023. (7 pages).

Intel: "82802 Firmware Hub: Random Number Generator Programmer's Reference Manual," Dec. 1, 1999, pp. 1-13, Retrieved from the Internet: URL: https://web.archive.org/web/20101018150456if_/http://www.intel.com:80/Assets/PDF/manual/298029.pdf.

* cited by examiner

OFF-CHIP MEMORY ADDRESS SCRAMBLING APPARATUS AND METHOD FOR SYSTEM ON CHIP

CROSS-REFERENCE TO RELATED APPLICATIONS

This application is a national stage filing under 35 U.S.C. § 371 of International Application No. PCT/CN2018/122776, filed on Dec. 21, 2018, and published as WO 2019/120293A1, which claims the benefits of priority to Chinese application number 201711428664.8, filed Dec. 22, 2017, both of which are incorporated herein by reference in their entireties.

BACKGROUND

Along with the development of the mobile Internet, social informatization has reached an unprecedented level. Mobile network devices are the main representative of information interaction carriers. Mobile network equipment is a necessity in the current information society, and such functions as mobile offices and mobile transactions are widely promoted and applied. While the rapid development of mobile devices brings about convenience and efficiency, it is also necessary to protect the security of information stored in the mobile devices.

At the same time, security mechanisms have been added in the System on Chip (SoC) chip design. The conventional storage security protection, however, is based on an application or software and these types of conventional solutions are flawed. The software/applications not only occupy CPU resources and greatly lower the performance of a system chip as well as the efficiency of reading or writing an off-chip memory, but also can have difficulties defending against the problems of operating system vulnerabilities and software backdoor access.

SUMMARY OF THE DISCLOSURE

The present disclosure provides an off-chip memory address scrambling apparatus for a system on chip, including: a true random number generator, a key memory and an on-chip security controller that are disposed in the system on chip, the on-chip security controller being respectively connected to the true random number generator, the key memory and an off-chip memory that is disposed outside the system on chip and configured to store data, and being configured to read or write data in the off-chip memory and perform address scrambling processing on the data. The on-chip security controller includes a memory interface module and an address scrambling module.

DETAILED DESCRIPTION

To make the objectives, technical solutions, and advantages of the embodiments of the present disclosure clearer, the technical solutions in the embodiments of the present disclosure are described clearly and completely below with reference to the accompanying drawings in the embodiments of the present disclosure. Obviously, the described embodiments are merely some rather than all of the embodiments of the present disclosure. Based on the embodiments in the present disclosure, all other embodiments obtained by those with ordinary skill in the art without creative efforts should fall within the scope of protection of the present disclosure.

The off-chip memory address scrambling apparatus and method for a system on chip provided by the present disclosure can implement scrambling processing of a data address without affecting the efficiency of reading or writing an off-chip memory, thus ensuring that the system on chip can read or write data efficiently and securely.

Figure 1:
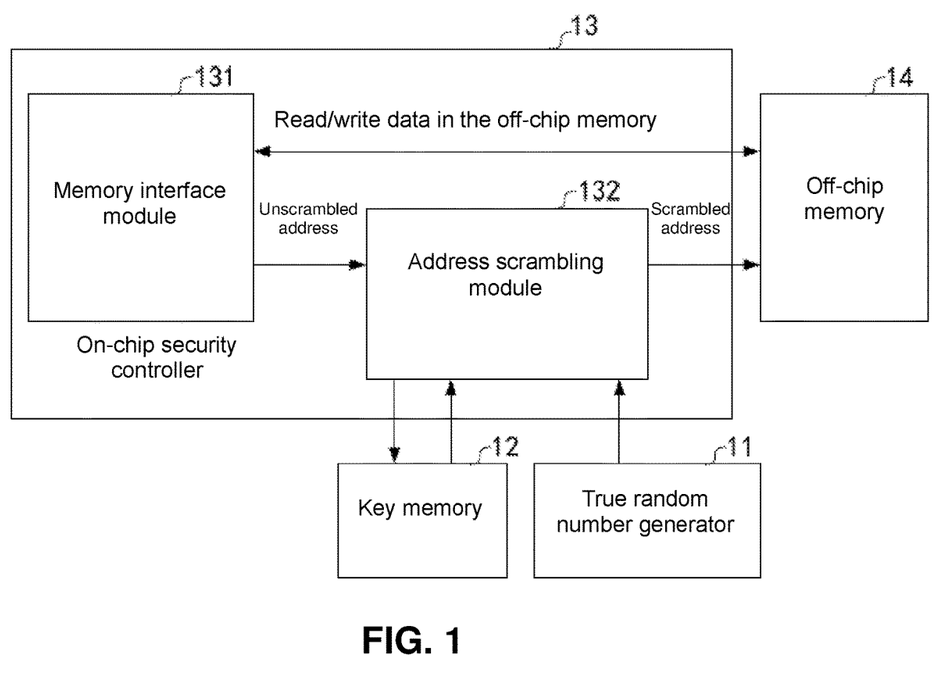
FIG. 1 is a schematic diagram of an exemplary off-chip memory address scrambling apparatus for a system on chip, according to some embodiments of the present disclosure.

The embodiments of the present disclosure provide an off-chip memory address scrambling apparatus for SoC architectures. FIG. 1 is a schematic diagram of an exemplary off-chip memory address scrambling apparatus for a system on chip, according to some embodiments of the present disclosure. As shown in FIG. 1, the apparatus includes the following hardware components: a true random number generator 11, a key memory 12 and an on-chip security controller 13. On-chip security controller 13 is respectively connected to true random number generator 11, key memory 12 and an off-chip memory 14 configured to store data. On-chip security controller 13 is configured to read or write data in off-chip memory 14 and perform address scrambling processing on the data. On-chip security controller 13 includes a memory interface module 131 and an address scrambling module 132.

Memory interface module 131 is configured to output to an address scrambling module 132 an unscrambled address in data formed by reading from or writing to off-chip memory 14.

Address scrambling module 132 is connected to memory interface module 131, true random number generator 11, key memory 12, and off-chip memory 14. Address scrambling module 132 is configured to read a random key stored in key memory 12, to select an appropriate random key, and to scramble an address received from memory interface module 131 according to the random key scrambling algorithm, and to output the scrambled address to off-chip memory 14. It is appreciated that the selection of the appropriate random key can be based on whether the read random key is in a valid/invalid state. For example, if the read random key is a pre-defined constant value (e.g., 0x00000000 or 0xFFFFFFFF), the constant value indicates that the read random key is in an invalid state. If the random key read from key memory 12 is not the constant value, the read random key is determined to be in a valid state. If the read random key is valid, the read random key is used for scrambling. If, however, the read random key is invalid, address scrambling module 132 can read another random key that is generated by true random number generator 11 and stored into key memory 12.

In embodiments of the present disclosure, the off-chip memory address scrambling apparatus for SoC architectures mainly employs a true random number generator, a key memory and an on-chip security controller to scramble an address in an off-chip memory in such a manner that data stored in the off-chip memory is out of order. Accordingly, attacks to the SoC architecture that are completed by directly modifying the off-chip memory or replacing the off-chip memory are rendered obsolete. Therefore, after the address scrambling processing is implemented for the off-chip memory, a memory chip replicated according to a hacked memory chip cannot work normally such that the system is non-replicable, thus further ensuring the encryption security and confidentiality of the apparatus. Moreover, when the off-chip memory is accessed, the apparatus automatically scrambles an access address using an address scrambling module. The efficiency of reading or writing the off-chip memory is not affected, thus ensuring that the apparatus can read or write data efficiently and securely.

Figure 2:
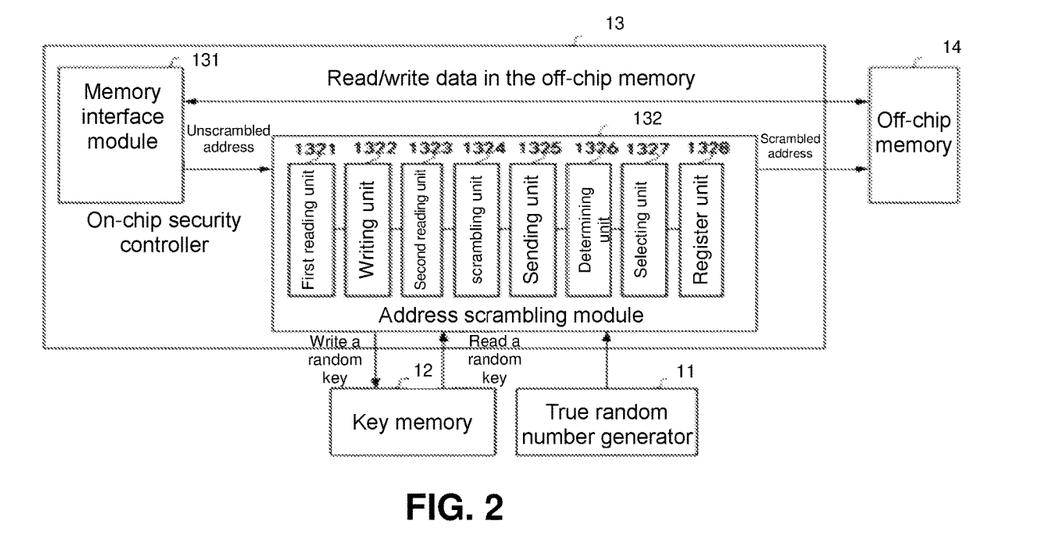
FIG. 2 is a schematic diagram of an exemplary off-chip memory address scrambling apparatus for a system on chip, according to some embodiments of the present disclosure.

FIG. 2 is a schematic diagram of an exemplary off-chip memory address scrambling apparatus for a system on chip, according to some embodiments of the present disclosure. As shown in FIG. 2, address scrambling module 132 further includes the following hardware components: a first reading unit 1321 configured to read the random key generated by true random number generator 11, a writing unit 1322 configured to write the random key generated by true random number generator 11 into key memory 12, a reading unit 1323 configured to read the random key stored in key memory 12, a scrambling unit 1324 comprising hardware components and configured to timely perform scrambling algorithm processing on an inputted unscrambled address according to the read random key to form a scrambled address, and a sending unit 1325 configured to output the scrambled address to off-chip memory 14. The timely performance of the scrambling indicates that the scrambling takes place within the same cycle as when the address is obtained.

In some embodiments, address scrambling module 132 further includes a determining unit 1326 configured to determine whether the random key read by reading unit 1323 is valid. Address scrambling module 132 can further include a selecting unit 1327 connected to determining unit 1326 and configured to select a random key according to the valid/invalid state of the read random key. If the read random key is valid, the read random key is used for scrambling. If, however, the read random key is invalid, address scrambling module 132 can read another random key that is generated by true random number generator 11 and stored into key memory 12.

In some embodiments, address scrambling module 132 further includes a register unit 1328 configured to save the random key read by reading unit 1323.

In some embodiments, the random key generated by true random number generator 11 is written into key memory 12 once for storage and is unalterable, or the random key generated by true random number generator 11 is written into key memory 12 at least twice for storage.

Figure 3:
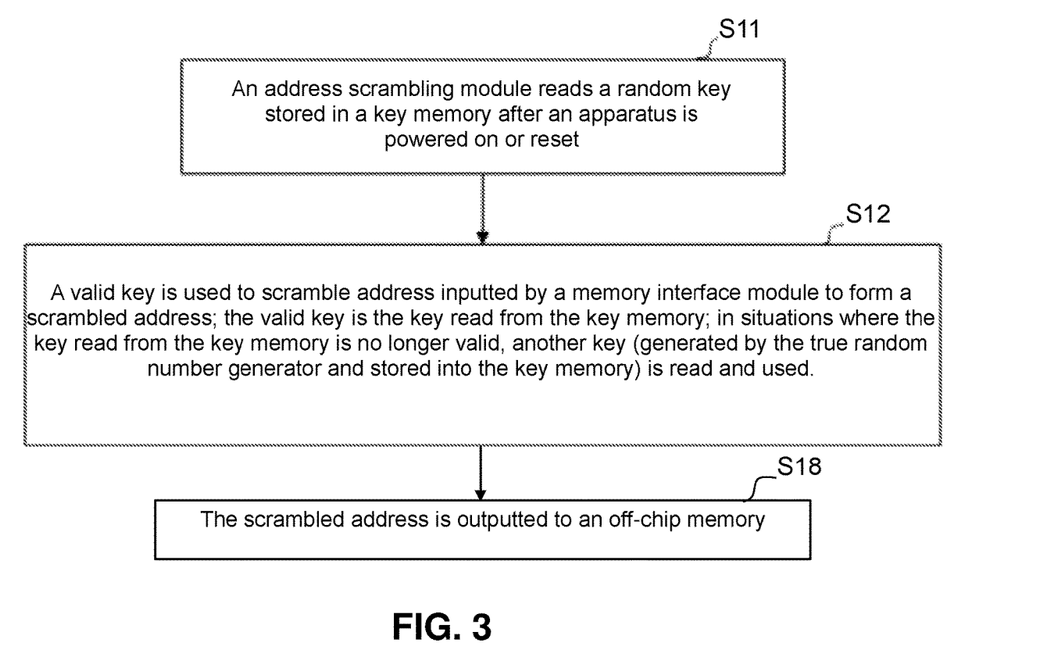
FIG. 3 is a flowchart of an exemplary off-chip memory address scrambling method for a system on chip, according to some embodiments of the present disclosure.

Some embodiments of the present disclosure further provide an off-chip memory address scrambling method for a SoC architecture. FIG. 3 is a flowchart of an exemplary off-chip memory address scrambling method for a SoC architecture, according to some embodiments of the present disclosure. As shown in FIG. 3, the method includes steps S11 and S12. In step S11, after an apparatus is powered on or reset, an address scrambling module (e.g., address scrambling module 132) reads a random key stored in a key memory (e.g., key memory 12).

In step S12, a valid key is used to scramble address inputted by a memory interface module (e.g., memory interface module 131) to form a scrambled address. In some embodiments, the valid key is the key read from the key memory. In situations where the key read from the key memory is no longer valid, another key (generated by the true random number generator and stored into the key memory) is read.

At step S18, the scrambled address is outputted to an off-chip memory (e.g., off-chip memory 14).

In the off-chip memory address scrambling method for the SoC architecture provided by embodiments of the present disclosure, the method mainly employs a true random number generator, a key memory, and an on-chip security controller to scramble an address in an off-chip memory in such a manner that data stored in the off-chip memory is out of order. Accordingly, attacks to the SoC architecture that are completed by directly modifying the off-chip memory or replacing the off-chip memory are rendered obsolete. Therefore, after the address scrambling processing is implemented for the off-chip memory, a memory chip replicated according to a hacked memory chip cannot work normally since the system is non-replicable, thus further ensuring the encryption security and confidentiality of the apparatus. Moreover, when the off-chip memory is accessed, the method automatically scrambles an access address using an address scrambling module. The efficiency of reading or writing the off-chip memory is not affected, thus ensuring that the apparatus can read or write data efficiently and securely. In the third aspect, the method further determines the validity of a random key stored in the key memory in such a manner that the security performance of the method is improved by ensuring the validity of the random key.

Figure 4:
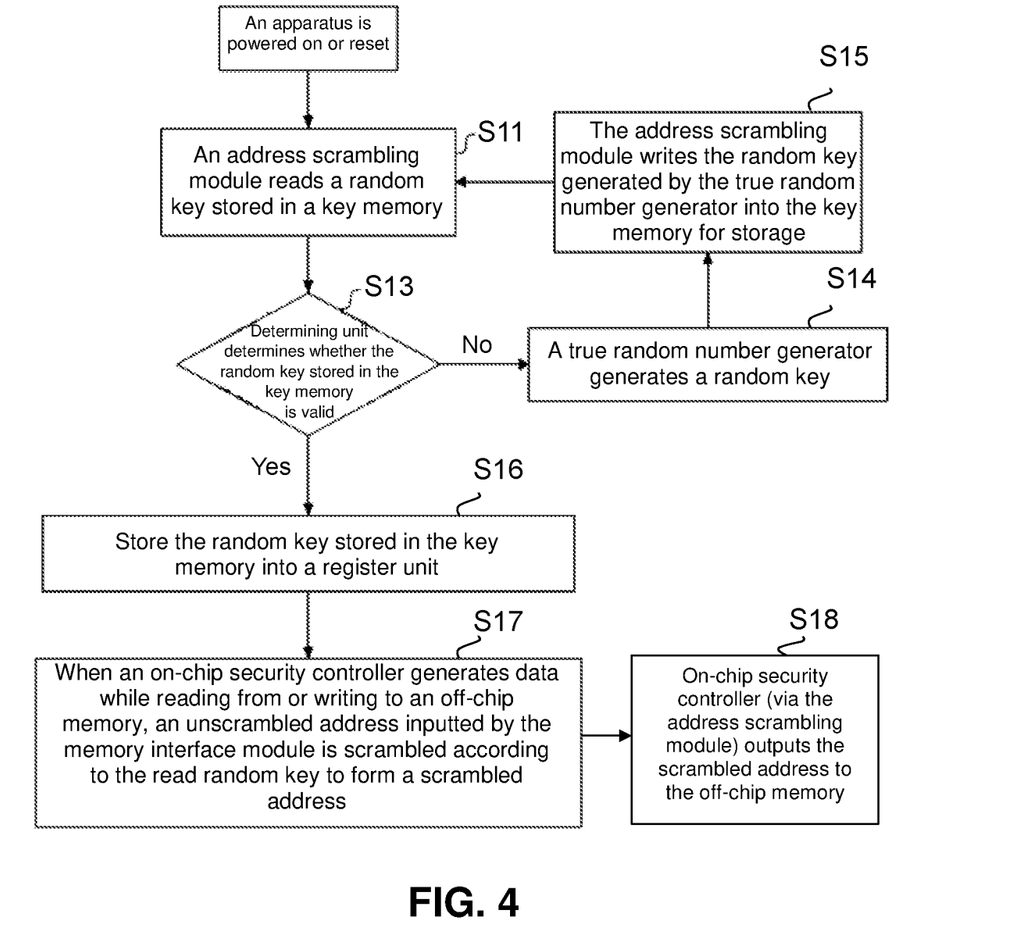
FIG. 4 is a flowchart of an exemplary off-chip memory address scrambling method for a system on chip, according to some embodiments of the present disclosure.
Figure 5:
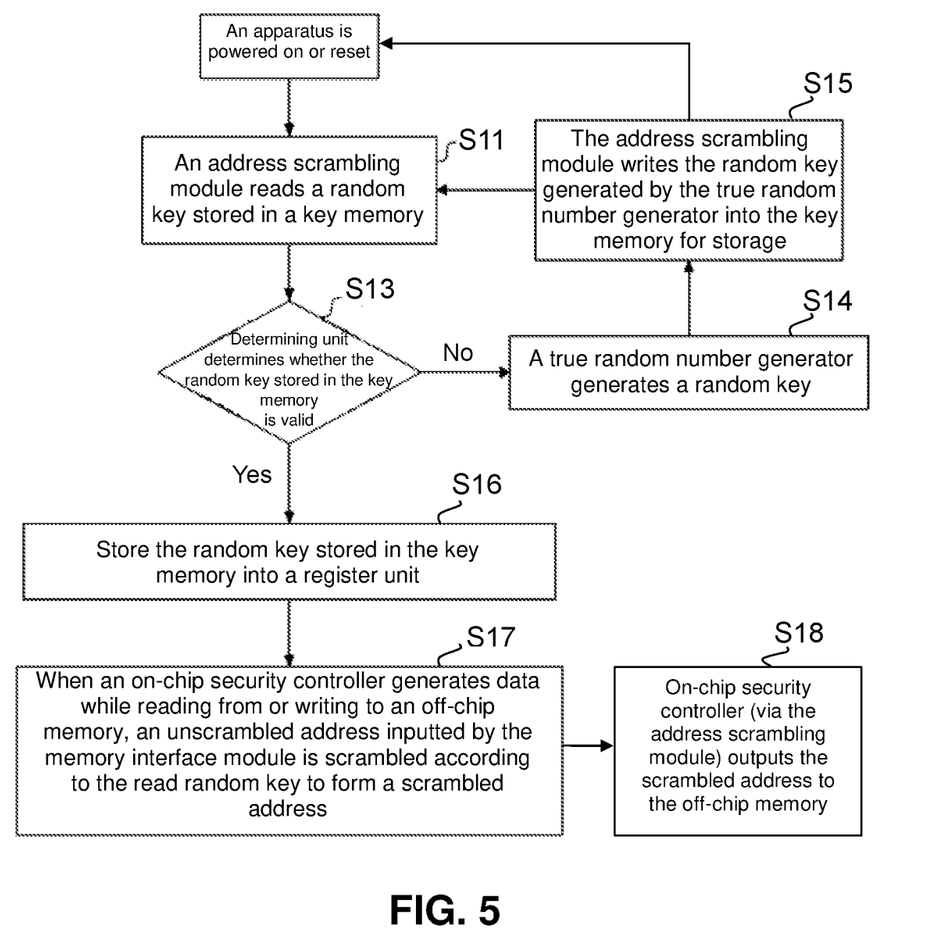
FIG. 5 is a flowchart of an exemplary off-chip memory address scrambling method for a system on chip, according to some embodiments of the present disclosure.

In some embodiments, as shown in FIG. 4 and FIG. 5, after step S11 of reading by an address scrambling module a random key stored in a key memory after an apparatus is powered on or reset, the method further includes steps S13, S14, S15, S16 and S17. In step S13, a determining unit (e.g., determining unit 1326) determines whether the random key stored in the key memory is valid.

In step S14, when the random key stored in the key memory is invalid, the true number generator generates a new random key. In step S15, the address scrambling module writes the newly generated random key into the key memory for storage. In some embodiments, as shown in FIG. 4, the method proceeds to step S11, in which the random key stored in the key memory is read by the address scrambling module. In other embodiments, e.g., as shown in FIG. 5, after step S15, the method proceeds to power up or reset the apparatus.

If, however, the random key stored in the key memory is valid in step S13, the method proceeds to step S16, in which the read random key is stored into a register unit. In step S17, when the on-chip security controller generates data while reading from or writing to the off-chip memory, an unscrambled address inputted by the memory interface is scrambled according to the read random key to form a scrambled address. At step S18, the on-chip security controller (via the address scrambling module) outputs the scrambled address to the off-chip memory.

In some embodiments, in the step of performing according to the random key scrambling algorithm processing on an unscrambled address inputted by a memory interface module to form a scrambled address, the method further includes creating a one-to-one correspondence between the unscrambled address and the scrambled address according to the following mapping formula, the position specified by the unscrambled address being different from the position specified by the scrambled address:

$$addr(0,n) <=> addr'(0,n'), n \in (0,x), n' \in (0,x)$$

For example, the scrambling of the unscrambled address is implemented using a closed address interval in the address scrambling module (e.g., the address scrambling module 132). There is a one-to-one relationship between the unscrambled address and the scrambled address formed after the scrambling. The unscrambled address does not go beyond the closed address interval, hence finally forming a corresponding mapping relationship.

In some embodiments, the step of scrambling an address further includes controlling according to the random key a hardware component to perform periodic scrambling algorithm processing on the unscrambled address outputted by the memory interface module so as to form a scrambled address, wherein the scrambling algorithm is unique to the off-chip memory and the chip.

For example, the method can further employ different scrambling algorithms according to different off-chip memories and different chips in such a manner that the scrambling implemented by the method is unique, thereby improving the security performance of the method. In some embodiments, a non-linear algorithm may be used as the scrambling algorithm to further improve the security of the off-chip memory address scrambling.

In some embodiments, according to the method, after an apparatus is powered on or reset, a second reading unit of an address scrambling module automatically reads a random key stored in a key memory. Then a determining unit of the address scrambling module determines whether the random key stored in the key memory is valid. When the random key is valid, the random key is registered into a register unit in such a manner that the scrambling unit can directly invoke the random key. When an on-chip security controller generates data while reading from or writing to an off-chip memory, an unscrambled address inputted by the memory interface is scrambled according to the random key, and the scrambled address is outputted to the off-chip memory. At the same time, the memory interface module further outputs to the off-chip memory a control/data signal in the data generated by reading or writing the off-chip memory.

The method can be used to control the technical solution of the foregoing apparatus embodiments and has a similar implementation principle and technical effect. The specifics are not described here again.

It is appreciated that all or a part of the process in the method in the foregoing embodiments can be implemented by a computer program instructing related hardware. The program can be stored in a computer readable storage medium, and when being executed the program can include processes of the embodiments of the methods above. The storage medium can be a magnetic disk, an optical disc, a Read-Only Memory (ROM), a Random Access Memory (RAM), etc.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Specific implementation manners of the present disclosure are described above, but the protective scope of the present disclosure is not limited to these implementation manners. Any change or replacement that can be easily conceived of by those skilled in the art without departing from the technical scope disclosed by the present disclosure shall be covered in the protective scope of the present disclosure. Therefore, the protection scope of the present disclosure shall be subject to the protective scope of the claims.

The invention claimed is:

1. A memory address scrambling apparatus disposed on a system on a chip (SoC) that is coupled to an off-chip memory, comprising:
   a true random number generator configured to generate random keys;
   a key memory configured to store the random keys; and
   an on-chip security controller communicatively coupled to the true random number generator, the key memory, and the off-chip memory, the on-chip security controller comprising:
      a memory interface module configured to output an address for data to be read from or written to the off-chip memory, and
      an address scrambling module comprising:
         a writing unit including circuitry configured to write random keys generated by the true random number generator into the key memory;
         a first reading unit including circuitry configured to read a first random key stored in the key memory;
         a second reading unit including circuitry configured to read a second random key stored in the key memory;
         a determining unit including circuitry configured to determine whether the first random key is valid or the second random key is valid;
         a scrambling unit including circuitry configured to scramble the address received from the memory interface module using a valid random key, wherein the valid random key is the first random key or the second random key; and
         a sending unit including circuitry configured to output the scrambled address to the off-chip memory.

2. The apparatus of claim 1, wherein:
   the address scrambling module is further configured to:
      in response to the determining unit determining that the first random key is valid, designating the first random key as the valid random key; and
      in response to the determining unit determining that the first random key is invalid, designating the second random key as the valid random key.

3. The apparatus of claim 1, wherein the address scrambling module further comprises:
   a selecting unit connected to the determining unit and configured to:
      in response to the determination that the second random key is valid, designate the second random key as the valid random key;
      in response to the determination that the second random key is invalid, read a new random key stored in the key memory.

4. The apparatus of claim 1, wherein the address scrambling module further comprises a register unit including circuitry configured to save the second random key read by the second reading unit.

5. The apparatus of claim 1, wherein each random key generated by the true random number generator is written into the key memory by the writing unit and remains unalterable.

6. The apparatus of claim 1, wherein each random key generated by the true random number generator is written into the key memory by the writing unit at least twice for storage.

7. A memory address scrambling method for a system on chip (SoC), comprising:
- writing, by a writing unit, random keys generated by a true random number generator disposed on the SoC after an apparatus is powered on or reset into a key memory disposed on the SoC;
- reading, by a first reading unit, a first random key stored in the key memory;
- reading, by a second reading unit, a second random key stored in the key memory;
- determining whether the first random key is valid or the second random key is valid;
- scrambling, by a scrambling unit and using a valid random key, wherein the valid random key is the first random key or the second random key, an address inputted by a memory interface module disposed on the SoC; and
- outputting, by a sending unit, the scrambled address to a memory disposed off of the SoC.

8. The method of claim 7, further comprising:
- in response to the determination that the first random key is valid, designating the first random key as the valid random key.

9. The method of claim 7, wherein after determining whether the first random key is valid, the method further comprises:
- in response to the determination that the first random key is invalid, powering on or resetting the apparatus.

10. The method of claim 7, further comprising:
- in response to the determination that the first random key is invalid, designating the second random key as the valid random key.

11. The method of claim 7, wherein scrambling, using the valid random key, the address comprises:
- creating a one-to-one correspondence between the address and the scrambled address according to:

$$addr(0,n) <=> addr'(0,n'), n \in (0,x), n' \in (0,x)$$

wherein a position specified by the address is different from a position specified by the scrambled address.

* * * * *